United States Patent

Chiba

(10) Patent No.: US 7,853,118 B2
(45) Date of Patent: Dec. 14, 2010

(54) IMAGE REPLAY APPARATUS AND METHOD FOR MOVING-PICTURE STREAMS

(75) Inventor: Shunichi Chiba, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1164 days.

(21) Appl. No.: 11/499,757

(22) Filed: Aug. 7, 2006

(65) Prior Publication Data

US 2007/0047910 A1     Mar. 1, 2007

(30) Foreign Application Priority Data

Aug. 31, 2005    (JP) ............... 2005-251038

(51) Int. Cl.
    *H04N 5/91*      (2006.01)
(52) U.S. Cl. ..................... 386/68; 386/111
(58) Field of Classification Search ............... 386/46, 386/68, 95, 111, 125
See application file for complete search history.

(56) References Cited

U.S. PATENT DOCUMENTS 7,610,605 B2 * 10/2009 Negishi et al. ............ 725/94

| 2002/0016970 A1 | 2/2002 | Negishi et al. |
| 2004/0146285 A1 | 7/2004 | Matsui et al. |
| 2005/0141853 A1 | 6/2005 | Takemura |

FOREIGN PATENT DOCUMENTS

| JP | 3364869 | 11/2002 |
| JP | 2004-180341 | 6/2004 |
| JP | 3609488 | 10/2004 |
| JP | 2004-350043 | 12/2004 |

* cited by examiner

*Primary Examiner*—Huy T Nguyen
(74) *Attorney, Agent, or Firm*—Finnegan, Henderson, Farabow, Garrett & Dunner, L.L.P.

(57) ABSTRACT

According to one embodiment, a moving-picture-stream replay apparatus includes a first-replay-start time acquisition section which acquires, in accordance with a replay speed N, a replay start time that indicates a time elapsing from a leading portion of the moving-picture stream data, a transmission section which transmits, to a server, a request signal to request compressed image data corresponding to about 1 second of a replay time of the moving-picture stream data, a storage control section which stores, into a memory, part of the moving-picture stream data sent in response to the request signal, a transfer control section which transfers the reference picture data to a decoder, and a next-replay-start time acquisition section which computes a next replay start time after the reference picture data is transferred to the decoder.

10 Claims, 4 Drawing Sheets

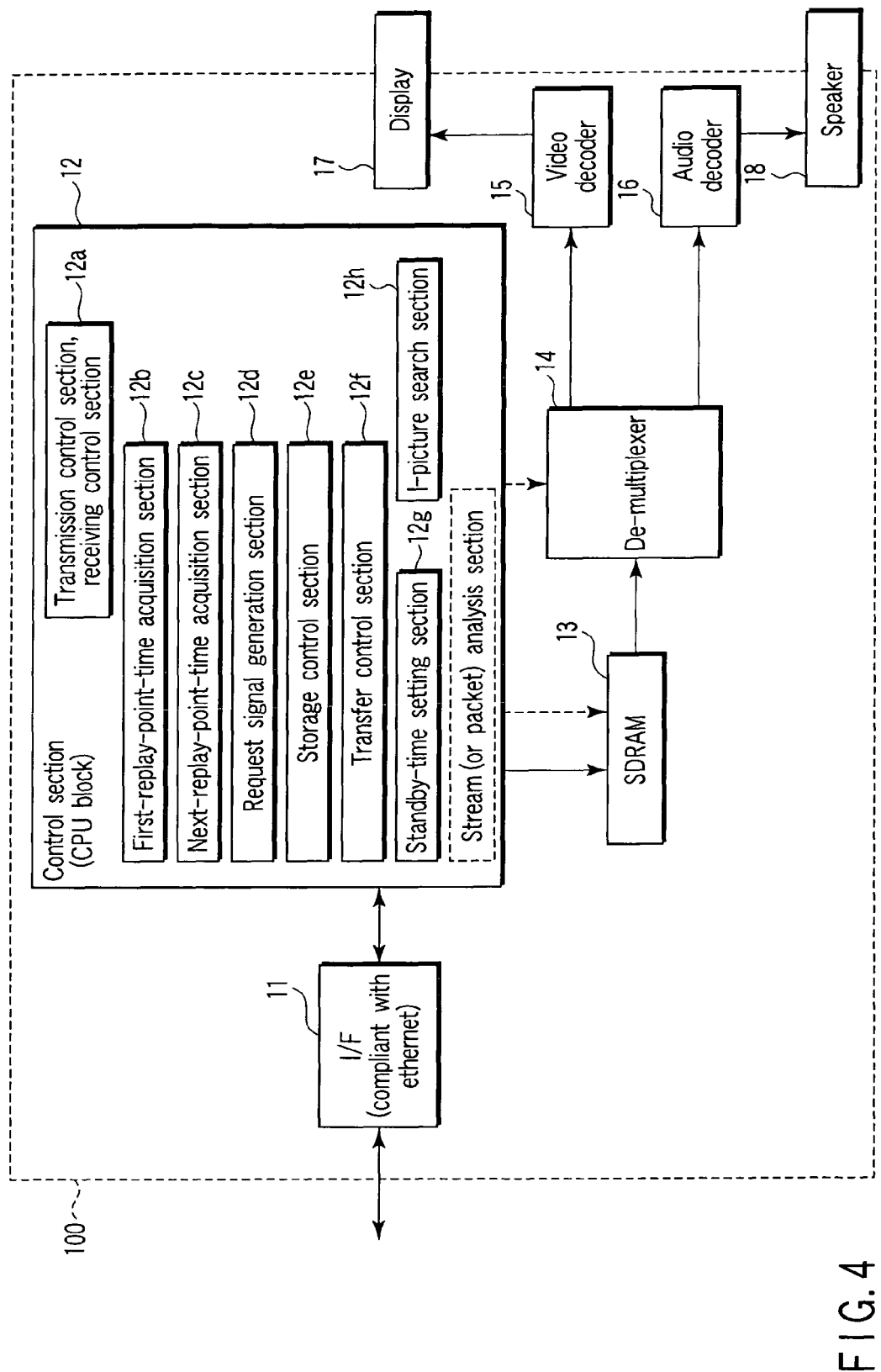
F I G. 4

IMAGE REPLAY APPARATUS AND METHOD FOR MOVING-PICTURE STREAMS

CROSS-REFERENCE TO RELATED APPLICATIONS

This application is based upon and claims the benefit of priority from Japanese Patent Application No. 2005-251038, filed Aug. 31, 2005, the entire contents of which are incorporated herein by reference.

BACKGROUND

1. Field

One embodiment of the invention relates to an image replay apparatus and method for moving-picture streams. More particularly, it relates to an image replay apparatus capable of easily fetching moving-picture streams from a server via a network and subjecting them to a special replay, and an image replay method employed in the apparatus.

2. Description of the Related Art

In recent years, digital broadcasting (such as terrestrial digital broadcasting, broadcast satellite (BS) broadcasting, and 110-degree communication satellite (CS) broadcasting) has been spread in Japan. On the other hand, information-recording mediums, such as hard disks and optical disks, have increased their capacities. In accordance with these tendencies, record/replay apparatuses and methods have been developed, which are connected to, for example, a digital television receiver for automatically recording desired programs on those mediums.

Further, recent digital television receivers and digital record/replay apparatuses have a network connection function that enables the apparatuses to fetch information from a server.

Jpn. Pat. Appln. KOKAI Publication No. 2004-180341 discloses a technique for acquiring video data from a server. Further, Jpn. Pat. Appln. KOKAI Publication No. 2004-350043 discloses a technique for enabling a client to request content from a server, more specifically, a technique for enabling the client to set a variable-speed-replay request.

As described above, apparatuses capable of acquiring a moving-picture stream from a server via a network and subjecting it to a special replay have been developed. However, these apparatuses may well raise problems when servers significantly differ from each other in performance and function.

For instance, some servers have a high network performance of 50 Mbps or more, and some servers have a low network performance of about 10 Mbps. Further, some servers can provide detailed information (e.g., I-picture position information) concerning MPEG (moving-picture experts group) 2 system, and some servers cannot provide it. There may occur the problem that a moving-picture stream subjected to a special replay cannot be acquired from a server that cannot provide detailed information (e.g., I-picture position information) concerning MPEG 2 system.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate an embodiment of the invention and not to limit the scope of the invention.

FIG. 4 is a block diagram illustrating in more detail the essential part of the apparatus shown in FIG. 1.

DETAILED DESCRIPTION

Figure 1:
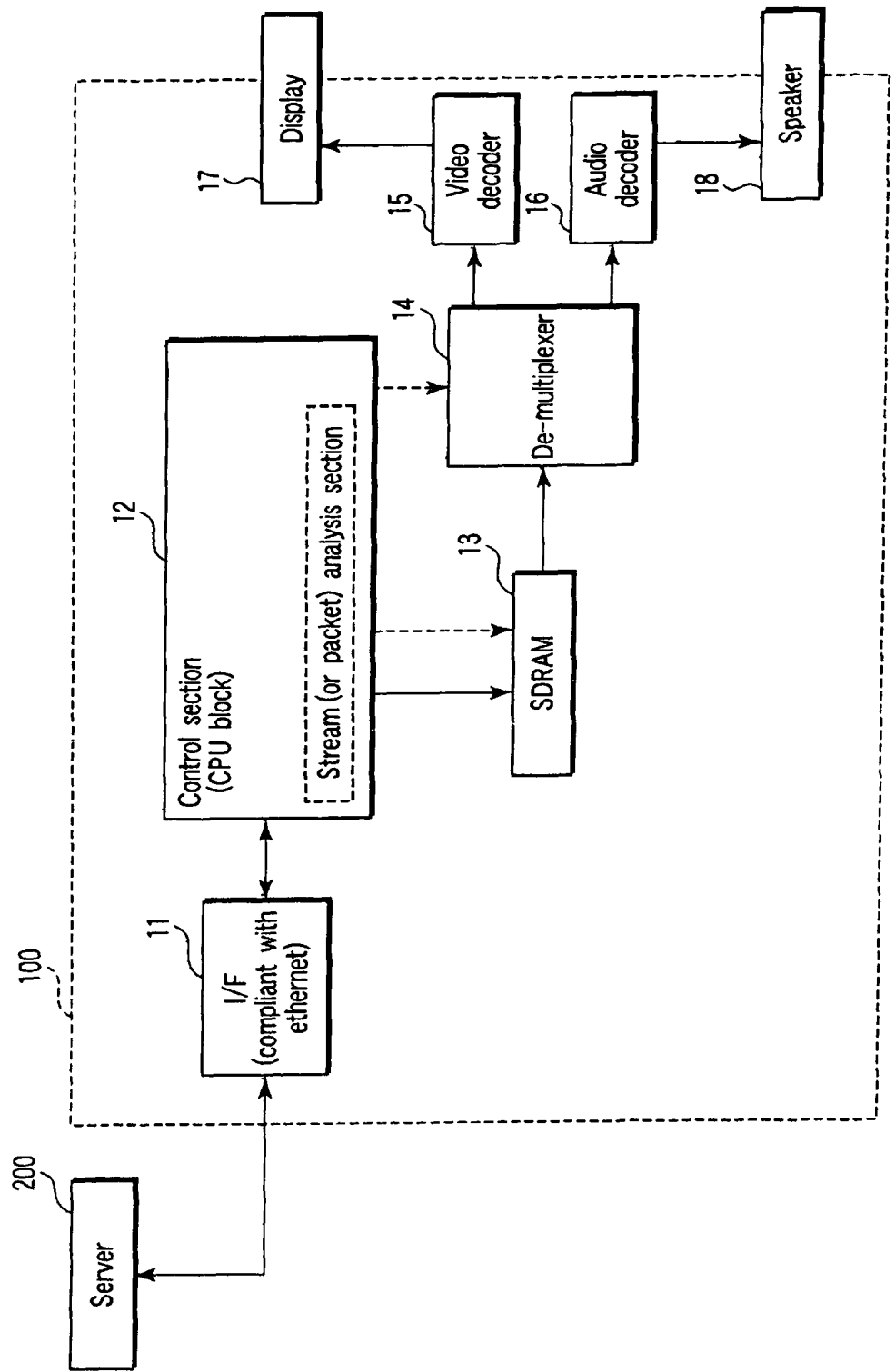
FIG. 1 is an exemplary block diagram illustrating the configuration of a moving-picture stream replay apparatus according to an embodiment of the invention.

An embodiment of the invention will be described hereinafter with reference to the accompanying drawings.

The embodiment enables each portion of a moving-picture stream subjected to a special replay to be easily fetched from a server.

The embodiment is directed to an image replay apparatus 100 for moving-picture stream data, which intermittently acquires and displays compressed image data as reference image data for moving-picture stream data of a preset standard, thereby performing a special replay. The apparatus 100 comprises a first-replay-time acquisition section 12b, request signal generation section 12d, transmission section 12a, storage control section 12e, transfer control section 12f and next-replay-start-time acquisition section 12c (refer to FIG. 4). The first-replay-start-time acquisition section 12b operates at the start of a replay, and acquires, in accordance with a replay speed, a replay start time that indicates the time elapsing from the detection of the leading portion of moving-picture stream data. The request signal generation section 12d generates, based on the replay start time, a request signal for requesting compressed data that corresponds to about 1 second of the replay time of the moving-picture stream data and starts from the replay start time. The transmission section 12a transmits the request signal to a server. The storage control section 12e stores, into a memory 13, part of the moving-picture stream data sent in response to the request signal. The transfer control section 12f searches the memory for reference picture data, and transfers it to a video decoder 15. The next-replay-start time acquisition section 12c operates after the start of the replay, and computes the next replay start time after the reference picture data is transferred to the video decoder 15.

The above configuration enables reliable acquisition of reference picture data and execution of a special replay of the reference picture data, even if the server does not send stream detailed information including replay-start time information for the reference picture data.

The embodiment will now be described in detail with reference to the accompanying drawings. FIG. 1 shows the basic configuration of the image replay apparatus 100. The image replay apparatus 100 is connectable to a server 200 via an interface 11 and a network. The network connection may be, for example, Ethernet (trademark) connection.

The information acquired via the interface 11 is sent to the control section 12, where picture stream or packet data included in the acquired information is analyzed. The picture stream data is MPEG 2 stream data. The control section 12 recognizes MPEG 2 stream data, and outputs it to a synchronous dynamic random-access memory (SDRAM) 13. The data in the SDRAM 13 is separated in units of elementary streams by a demultiplexer 14, and video data and audio data are sent to the video decoder 15 and audio decoder 16, respectively.

A video signal output from the video decoder 15 is displayed on a display 17, while an audio signal output form the audio decoder 16 is reproduced by a speaker 18.

Figure 2:
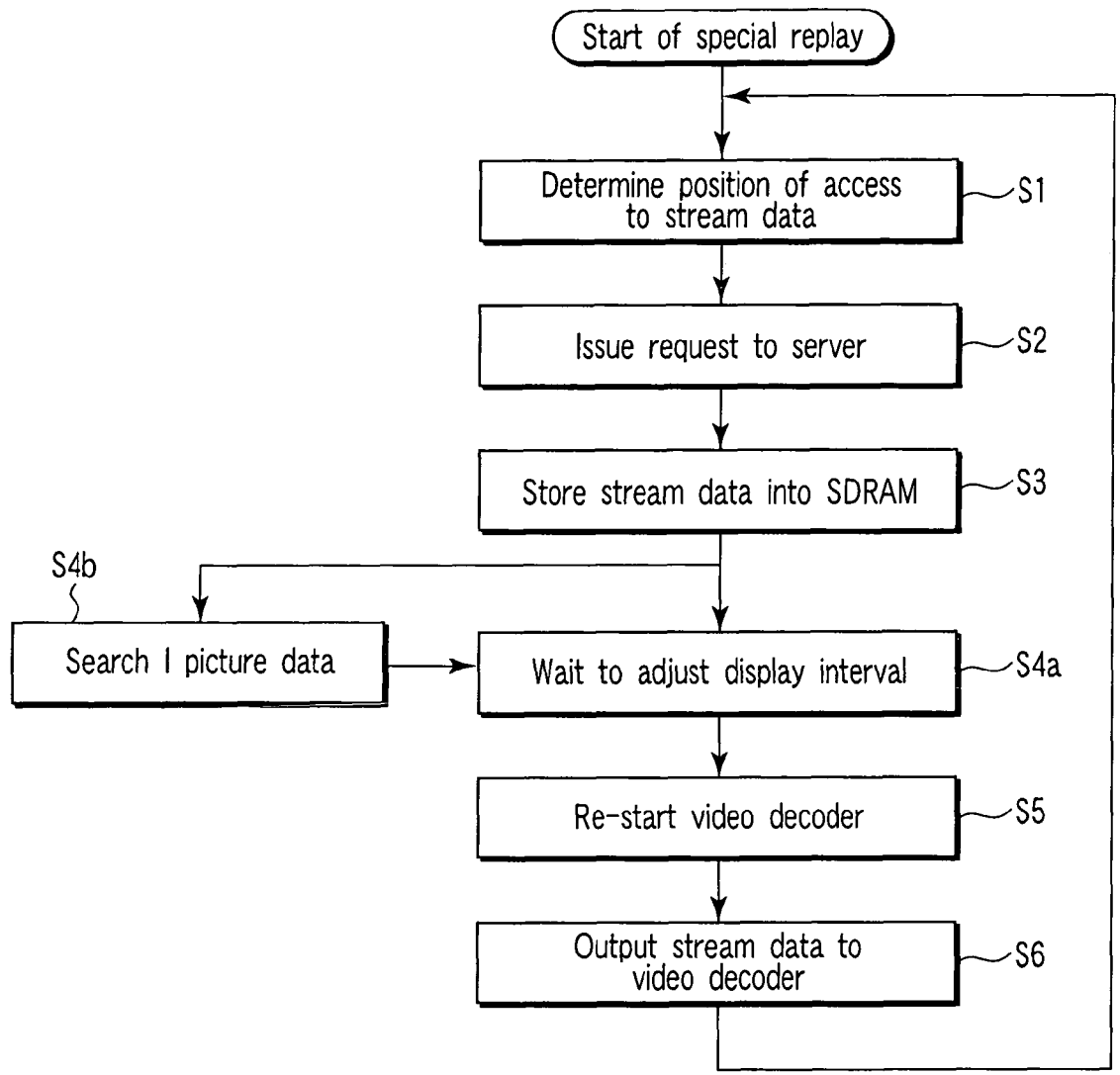
FIG. 2 is a flowchart useful in explaining an operation example of the apparatus of FIG. 1.

The image replay apparatus 100 is characterized by a method and means for requesting, in particular, the server 200 to send MPEG 2 stream data, and performs a special replay of the data. Referring to FIG. 2, the characterized operation will be described.

Assume here that a special replay indicates decoding of I picture data included in the MPEG 2 stream data, and that the special replay includes a replay at fast speed, backward replay, etc.

Step S1:

To execute the above-described special replay, it is necessary to determine which I picture data of the MPEG 2 stream data should be decoded, based on the speed of a special replay and the interval at which the I picture data is displayed. Namely, the position at which the MPEG 2 stream data is accessed is determined. The access position is acquired as, for example, the replay start time (the time elapsing from the detection of the leading portion of the stream data) of to-be-displayed I picture data. The method of computing the replay start time will be described later in detail.

Step S2:

The information indicating the replay start time of the I picture data acquired at step S1 is sent from the image replay apparatus 100 to the server 200 via a network. Namely, this is the basic operation for acquiring request information from the server 200.

The server 200 includes a type 1 server that provides MPEG 2 stream data and detailed information concerning the stream data, and a type 2 server that provides only MPEG 2 stream data. To deal with these servers, the following three cases will be described:

Case 1:

Stream detailed information for the type 1 server is management table information (file) indicating at which position in MPEG 2 stream data from, for example, the leading portion of the stream data, I picture data exists. Accordingly, when the image replay apparatus sends a request signal to the type 1 server, it analyzes the stream detailed information to acquire the position information concerning the I picture data based on the above-described replay start time of the I picture data, and sends, as a request signal, a signal indicating the acquired position information.

Such case 1 specifically corresponds to the case where the server provides MPEG 2 stream data based on the digital versatile disk (DVD) standards.

Case 2:

In general, MPEG 2 stream data is formed of 15 frames (corresponding to about 0.5 sec. replay time). It is strongly possible that I picture data is contained in stream data corresponding to 30 frames (about 1 sec. replay time).

In light of this, in case 2, a request to send stream data of 1 sec., which starts from the replay start time determined at step S1, is sent to the server 200.

Such case 2 as the above specifically corresponds to the case where in the server, MPEG 2 stream data is managed in terms of time by a personal computer. Namely, the personal computer manages the position of MPEG 2 stream data in a hard disk by measuring the time elapsing from the detection of the leading portion of the stream data.

Case 3:

There are servers in which the position of MPEG 2 stream data cannot be designated by the replay start time. In such servers, the position of information may be able to be designated by byte access.

In this case, it is necessary to send byte-position information as a request signal. In light of this, in case 3, the replay start time determined at step S1 is converted into a byte position in stream data from, for example, the leading portion of the stream data, using the average bit rate of the stream data, and the byte position is used as a request signal. The byte position is given by Byte position=Replay start time×Average bit rate of Stream data Accordingly, in case 3, a request signal containing information indicating the byte position and transmission size is sent to the server.

Step S3:

In reply to the request signal, part of MPEG 2 stream data is transmitted from the server via a network. The transmitted stream data is stored in the SDRAM 13. 24 Mbps stream data of 1 sec. is 3 Mbytes data.

The data stored in the SDRAM 13 may be directly supplied to the video decoder 15. However, this apparatus employs the following countermeasure to decode and display I picture data at accurately regular intervals:

Steps S4*a* and S4*b*:

As shown in FIG. 2, a standby time for adjusting the display intervals is prepared, and I picture data is searched for.

Specifically, at step S4*b*, time adjustment is performed. For instance, assume that the decoding output of I picture data is displayed at intervals of 0.5 sec. At this time, if only 0.1 sec. is required for the loop process at steps S1 to S6, the remaining time of 0.4 sec. is adjusted at step S4*b*.

The standby time can be computed based on the time required for the loop process at steps S1 to S6, and the I-picture display time determined from time information indicating the speed of the special replay.

Utilizing the standby time, the control section 12 searches the SDRAM 13 for I picture data. For this search, information contained in, for example, the picture layer of MPEG 2 stream data is referred to, thereby detecting the portion of the picture layer, which specifies that the picture type is the I picture. By virtue of this search, it is not necessary to transfer, to the video decoder 15, all image data items (GOP) stored in the SDRAM 13. Namely, the necessary minimum amount of data (i.e., only I picture data) can be transferred to the video decoder 15.

Step S5:

The video decoder 15 is restarted. There is a case where the data fetched in the SDRAM 13 at step S3 contains a plurality of I picture data items. However, the video decoder 15 decodes only the I picture data firstly detected. Accordingly, at step S5, the video decoder 15 is restarted.

Step S6:

The I picture data read from the SDRAM 13 is transferred to the video decoder 15 via the multiplexer 14, where it is decoded.

Figure 3:
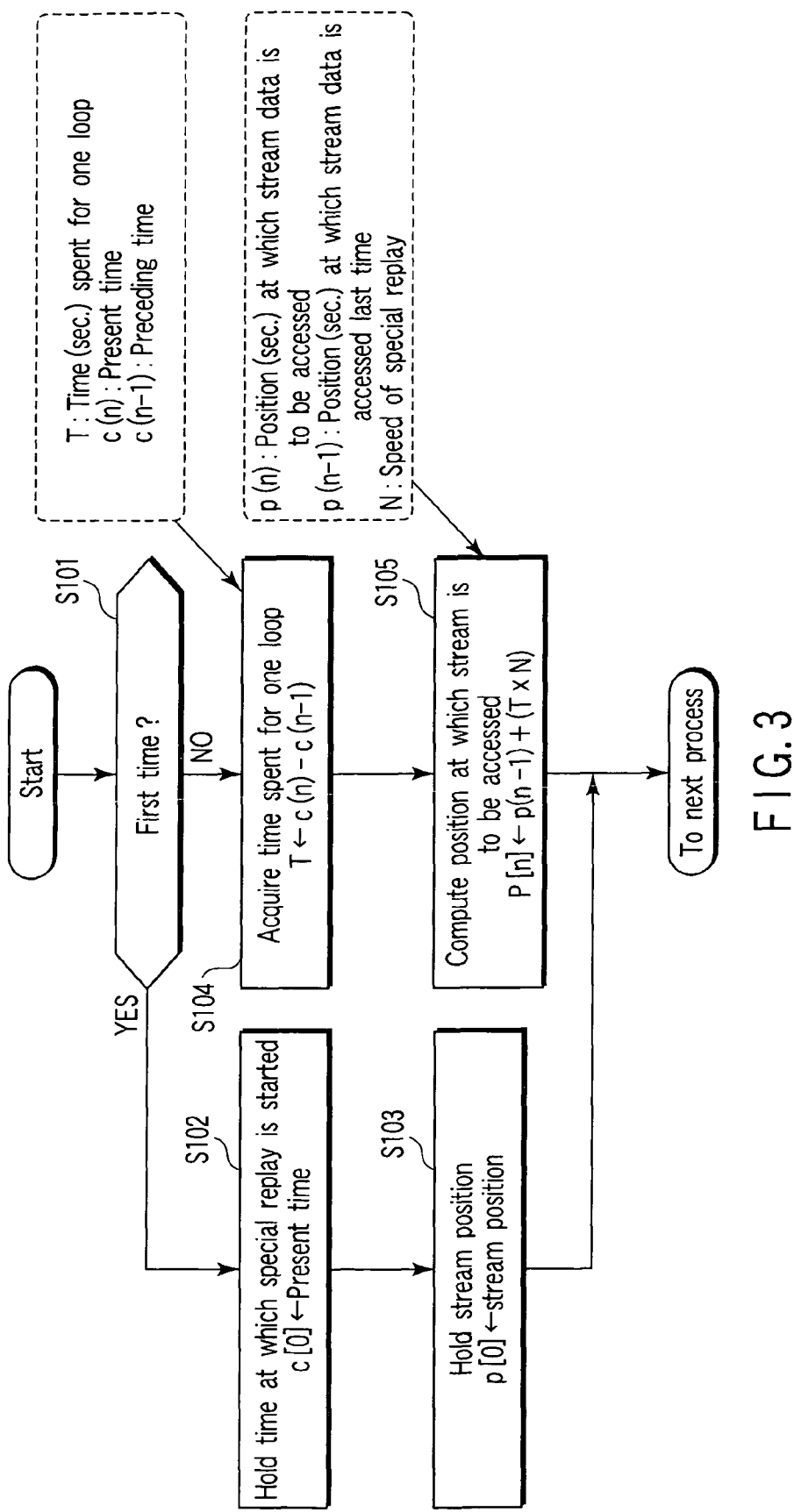
FIG. 3 is a flowchart illustrating in more detail the process performed at step S1 in FIG. 2.

FIG. 3 shows, in more detail, the process executed at step S1 of FIG. 2. If the process loop in FIG. 2 is the first one after the start of a special replay, the program shifts from step S101 to step S102. If the process loop in FIG. 2 is the second one or later one, the program shifts from step S101 to step S104.

Step S102:

At this step, the start time of the special replay is held. This is because the time required for one-loop processing differs between the states of the network or between servers, and hence it is necessary to compute the time required for one-loop processing.

Step S103:

At this step, the start position of the special replay, i.e., the stream position, is held. The stream position is reflected in a request signal, and determined from the fast replay speed or backward speed (the intervals of I picture data).

Step S104:

At this step, the time T spent for one-loop processing shown in FIG. 2 is computed, using the following equation:

$$T=c(n)c(n-1)$$

where c(n) represents the present time, and c(n−1) represents the time of the preceding process.

Step S105:

At this step, the position P(n) at which the stream data is accessed is computed, using the following equation:

$$P(n)=p(n-1)-(T\times N)$$

where p(n−1) represents the position at which the stream data is accessed, and N represents the speed of the special replay. In the case of backward feeding, N is set to a negative value.

As described above, the apparatus of the invention can easily request the I picture data of MPEG 2 stream data from servers of the schemes described in the above-mentioned cases 1, 2 and 3. The scheme of a request signal may be switched by a user between the schemes described in cases 1, 2 and 3. Alternatively, it may be switched automatically, and be fixed when the best I picture data is acquired.

FIG. 4 shows the essential part of the apparatus of the invention. The elements of the control section 12 form a moving-picture stream processing device that generates a request signal for intermittently acquiring reference picture data (I picture data) for moving-picture stream data of a preset standard (MPEG 2), and subjecting it to a special replay. The first-replay-start time acquisition section 12b acquires, in accordance with a replay speed, a replay start time that indicates the time elapsing from the detection of the leading portion of moving-picture stream data. Namely, this process is the process of holding the present time as described at step S102 of FIG. 3.

The request signal generation section 12d generates, based on the replay start time, a request signal for requesting compressed data corresponding to about 1 second of the replay time of the moving-picture stream data. This process corresponds to the above-mentioned cases 2 and 3. The transmission control section and the transmission control section of the receiving control section 12a transmits the request signal to a server. The receiving control section receives a signal sent from the server.

The storage control section 12e stores the supplied partial moving-picture stream data into the memory 13. The transfer control section 12f searches the memory for reference picture data, and transfers it to the video decoder 15. The next-replay-start time acquisition section 12c computes the next replay start time after the reference picture data is transferred to the video decoder 15. This computation corresponds to that performed at steps S104 and S105 in FIG. 3.

The control section 12 further comprises an I-picture search section 12h and standby-time setting section 12g. The search section 12h searches the memory 13 for the reference picture data (I picture data). The standby-time setting section 12g performs time adjustment before transferring the I picture data to the decoder 15. This process corresponds to step S4a in FIG. 2. The next-replay-start time acquisition section 12c, which operates after the start of the replay operation, computes the next replay start time by adding, to the preceding replay start time, a value obtained by multiplying the replay speed N by the one-loop time T required after the generation of the preceding replay start time until the reference picture data is decoded by the decoder in accordance with the request signal.

The request signal is used to request the server 200 to send stream data of 1 sec. after the replay start time, as in case 2, and indicates the start time of the replay and the length of the replay. Alternatively, the request signal indicates the byte position from the leading portion of stream data, and the byte size, as in case 2. In either case, the request signal requests stream data of 30 frames (corresponding to a replay of about one sec.), which is supposed to contain I picture data.

The apparatus of the invention may be an apparatus dedicated to the output of a request signal corresponding to case 2 or 3, or may be a compatible apparatus that can output both request signals corresponding to cases 2 and 3.

The present invention is not limited to the above-described embodiment, but may be modified in various ways without departing from the scope. Various inventions can be realized by appropriately combining the structure elements disclosed in the embodiment. For instance, some of the disclosed structural elements may be deleted.

While a certain embodiment of the inventions has been described, it has been presented by way of example only, and is not intended to limit the scope of the inventions. Indeed, the novel method and system described herein may be embodied in a variety of other forms; furthermore, various omissions, substitutions and changes in the method and system described herein may be made without departing from the spirit of the inventions. The accompanying claims and their equivalents are intended to cover such forms or modifications as would fall within the scope and spirit of the inventions.

What is claimed is:

1. A moving-picture-stream replay apparatus for intermittently acquiring compressed image data and displaying image data for moving-picture stream data of a preset standard, thereby realizing a special replay, the image replay apparatus comprising:
   a first-replay-start time acquisition section which acquires, in accordance with a replay speed N, a replay start time that indicates a time elapsing from a leading portion of the moving-picture stream data;
   a transmission section which transmits, to a server, a request signal to request the compressed image data corresponding to about 1 second of a replay time from the replay start time of the moving-picture stream data;
   a storage control section which stores, into a memory, part of the moving-picture stream data sent in response to the request signal;
   a transfer control section which searches the memory for the reference picture data, and transfers the reference picture data to a decoder; and
   a next-replay-start time acquisition section which computes a next replay start time after the reference picture data is transferred to the decoder.

2. The moving-picture-stream replay apparatus according to claim 1, further comprising a search section which searches the memory for the reference picture data.

3. The moving-picture-stream replay apparatus according to claim 1, further comprising a standby-time setting section which performs time adjustment before the reference picture data is transferred to the decoder.

4. The moving-picture-stream replay apparatus according to claim 1, wherein the next-replay-start time acquisition section computes the next replay start time by adding, to the replay start time, a value obtained by multiplying the replay speed N by a one-loop time T required after generation of the replay start time until the reference picture data is decoded by the decoder in accordance with the request signal.

5. The moving-picture-stream replay apparatus according to claim 1, wherein the request signal contains time information indicating the replay start time and time information indicating an amount of data to fetch.

6. The moving-picture-stream replay apparatus according to claim 1, wherein the request signal contains byte information indicating a replay start position and size information indicating an amount of data to fetch.

7. A moving-picture-stream replay method for use in a moving-picture-stream replay apparatus connected to a server and including a memory, a decoder and a control section for controlling an entire operation of the moving-picture-stream replay apparatus, the moving-picture-stream replay method being used for intermittently acquiring compressed image data and displaying image data for moving-picture stream data of a preset standard, thereby realizing a special replay, the image replay method comprising:

acquiring, in accordance with a replay speed N, a replay start time that indicates a time elapsing from a leading portion of the moving-picture stream data;

generating a request signal to request compressed image data corresponding to about 1 second of a replay time from the replay start time of the moving-picture stream data;

transmitting the request signal to the server;

storing, into the memory, part of the moving-picture stream data sent in response to the request signal;

transferring the reference picture data searched from the memory, to the decoder; and computing a next replay start time after the reference picture data is transferred to the decoder.

8. The moving-picture-stream replay method according to claim 7, further comprising searching the memory for the reference picture data.

9. The moving-picture-stream replay method according to claim 7, further comprising performing time adjustment before the reference picture data is transferred to the decoder.

10. The moving-picture-stream replay method according to claim 7, wherein the computing the next replay start time includes computing the next replay start time by adding, to the replay start time, a value obtained by multiplying the replay speed N by a one-loop time T required after generation of the replay start time until the reference picture data is decoded by the decoder in accordance with the request signal.

* * * * *